(12) United States Patent
Mochizuki

(10) Patent No.: US 12,716,570 B2
(45) Date of Patent: Aug. 25, 2026

(54) LIGHT SOURCE DEVICE AND HEATING SYSTEM INCLUDING LIGHT SOURCE DEVICE

(71) Applicant: NICHIA CORPORATION, Anan (JP)

(72) Inventor: Keiichi Mochizuki, Matsumoto (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 19/052,208

(22) Filed: Feb. 12, 2025

(65) Prior Publication Data

US 2025/0264206 A1 Aug. 21, 2025

(30) Foreign Application Priority Data

Feb. 15, 2024 (JP) ................................ 2024-020881

(51) Int. Cl.

| | |
|---|---|
| ***F21V 7/00*** | (2006.01) |
| ***F21V 5/04*** | (2006.01) |
| ***G03B 21/20*** | (2006.01) |
| ***H05B 1/02*** | (2006.01) |
| *F21Y 115/30* | (2016.01) |

(52) U.S. Cl.

CPC ............ *F21V 7/0083* (2013.01); *F21V 5/048* (2013.01); *G03B 21/2033* (2013.01); *G03B 21/2066* (2013.01); *H05B 1/0247* (2013.01); *F21Y 2115/30* (2016.08)

(58) Field of Classification Search

CPC ............. F21V 7/0083; G03B 21/2033; G03B 21/2066

See application file for complete search history.

(56) References Cited

U.S. PATENT DOCUMENTS

| | | | |
|---|---|---|---|
| 2017/0210006 A1 | 7/2017 | Takahashi | |
| 2018/0294623 A1 | 10/2018 | Hu et al. | |
| 2021/0191250 A1 * | 6/2021 | Kurita .................. | G03B 33/12 |

FOREIGN PATENT DOCUMENTS

| | | |
|---|---|---|
| JP | 2001-044547 | 2/2001 |
| JP | 2009-204871 | 9/2009 |
| JP | 2012-133337 | 7/2012 |
| JP | 2015-501508 | 1/2015 |
| JP | 2017-134992 | 8/2017 |
| JP | 2019-029295 | 2/2019 |
| JP | 2019-086532 | 6/2019 |
| JP | 2021-099484 | 7/2021 |
| JP | 2023-002985 | 1/2023 |
| WO | WO 2013/105546 | 7/2013 |
| WO | WO 2020/017214 | 1/2020 |
| WO | WO 2021/039131 | 3/2021 |
| WO | WO 2021/112248 | 6/2021 |

* cited by examiner

*Primary Examiner* — Sean P Gramling

(74) *Attorney, Agent, or Firm* — MORI & WARD, LLP

(57) ABSTRACT

A light source device includes first to fourth laser light sources that emit first to fourth laser light, a condenser lens, first to fourth reflecting surfaces that reflect the first to fourth laser lights toward the condenser lens, and first to fourth afocal systems disposed such that the first to fourth laser lights exit the first to fourth afocal systems toward the first to fourth reflecting surfaces. When a plan view taken in a direction along the optical axis is divided into first to fourth quadrants with a position of the optical axis serving as an origin, the first to fourth reflecting surfaces are located in the first to fourth quadrants, respectively.

18 Claims, 8 Drawing Sheets

FIG. 2

LIGHT SOURCE DEVICE AND HEATING SYSTEM INCLUDING LIGHT SOURCE DEVICE

CROSS-REFERENCE TO RELATED APPLICATIONS

The present application claims priority under 35 U.S.C. § 119 to Japanese Patent Application No. 2024-020881, filed Feb. 15, 2024, the contents of which are incorporated herein by reference in their entirety.

BACKGROUND

Technical Field

The present disclosure relates to a light source device and a heating system including the light source device.

Background Art

Japanese Patent Application Publication No. 2017-134992 A describes a lighting device that evenly irradiates a projection surface with light and includes a transmissive diffusion plate that allows for reducing density of irradiation to an irradiation optical system. The lighting device includes a light-emitting portion that emits light, a light condenser portion that condenses light emitted from the light-emitting portion, a first diffuser that diffuses light condensed by the light condenser, a homogenizing optical component that homogenize the illuminance distribution and then allows the homogenized light to exit it, and a second diffusion portion that diffuses light exited the homogenizing optical component.

SUMMARY

Semiconductor lasers are used not only for illumination but also for various processes such as heating, drying, and pressurization. A system using a semiconductor laser for illumination, processing, or the like preferably includes a more compact light source device that can more uniformly emit light from a large number of semiconductor lasers in accordance with the application.

According to one aspect of the present disclosure, a light source device includes a first laser light source configured to emit a first laser light; a second laser light source configured to emit a second laser light; a third laser light source configured to emit a third laser light; a fourth laser light source configured to emit a fourth laser light; a condenser lens; a first reflecting surface located at a first distance along an optical axis of the condenser lens from the condenser lens such that a reflection direction of the first laser light is directed toward the condenser lens along the optical axis; a second reflecting surface located at a second distance along the optical axis from the condenser lens such that a reflection direction of the second laser light is directed toward the condenser lens along the optical axis; a third reflecting surface located at a third distance along the optical axis from the condenser lens such that a reflection direction of the third laser light is directed toward the condenser lens along the optical axis; a fourth reflecting surface located at a fourth distance along the optical axis from the condenser lens such that a reflection direction of the fourth laser light is directed toward the condenser lens along the optical axis; a first afocal system disposed on a first optical path from the first laser light source to the first reflecting surface such that the first laser light exits toward the first reflecting surface; a second afocal system disposed on a second optical path from the second laser light source to the second reflecting surface such that the second laser light exits toward the second reflecting surface; a third afocal system disposed on a third optical path from the third laser light source to the third reflecting surface such that the third laser light exits toward the third reflecting surface; and a fourth afocal system disposed on a fourth optical path from the fourth laser light source to the fourth reflecting surface such that the fourth laser light exits toward the fourth reflecting surface. When a plan view taken in a direction along the optical axis is divided into a first quadrant, a second quadrant, a third quadrant, and a fourth quadrant with a position of the optical axis serving as an origin, the first reflecting surface is located in the first quadrant, the second reflecting surface is located in the second quadrant, the third reflecting surface is located in the third quadrant, and the fourth reflecting surface is located in the fourth quadrant.

In the light source device, reflecting surfaces are respectively disposed in first to fourth quadrants to form light bundles along the optical axis of the condenser lens, so that first to fourth laser light sources can be disposed at positions away from the optical axis, for example, positions orthogonal to the optical axis, and each of the laser light sources and a corresponding one of the reflecting surfaces are connected by an optical path including an afocal system from which a collimated light bundle exits, so that the influence of the position (distance) of each of the reflecting surfaces on the condenser lens can be reduced. Consequently, a more compact light source device that can emit a laser light in which laser lights from a plurality of laser light sources are converged via the condenser lens can be provided.

BRIEF DESCRIPTION OF DRAWINGS

FIG. 2 is a diagram illustrating a schematic configuration of a light source device.

DETAILED DESCRIPTION

Figure 1:
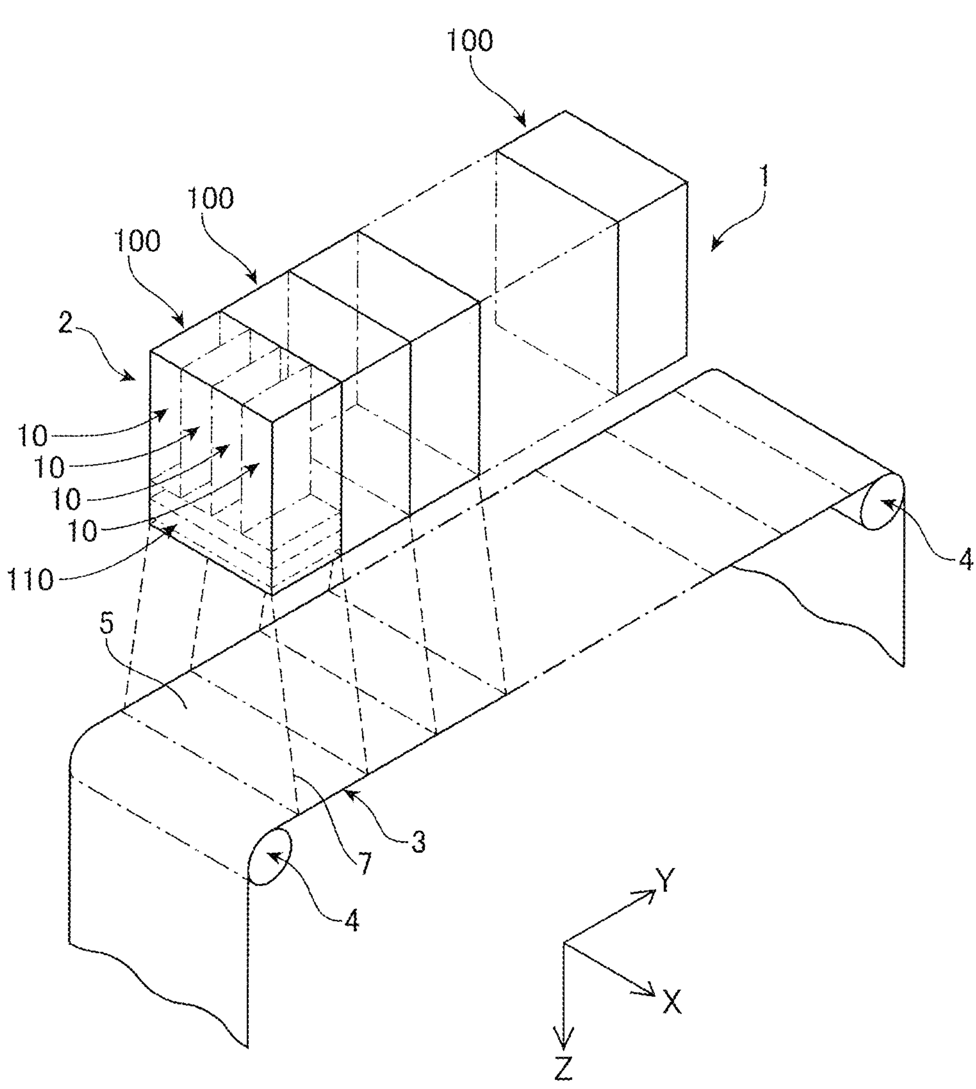
FIG. 1 is a diagram illustrating a schematic configuration of a heating system.

FIG. 1 illustrates a schematic configuration of a heating system configured to heat an object, for example, an electrode material of a secondary battery, as an example of a processing apparatus that emits a plurality of laser beams. The heating system 1 includes a conveying device 4 that conveys a heating target 3 in a first direction (Y direction), and a heating device 2 that emits a laser light 7 for heating toward the conveying device 4. The heating device 2 includes a plurality of heating modules 100 arranged in the conveyance direction (Y direction). Each of the heating modules 100 includes a plurality of light source devices 10 and an optical system 110 that is configured to bundle light emitted from the plurality of light source devices 10 and to cause the heating target 3 to be irradiated with the bundled light. An example of the optical system 110 is an optical system (optical axis adjustment optical system) including a plurality of projector optical axis adjustment mechanisms. Each of the light source devices 10 is arranged so as to be shorter in an X direction orthogonal to the conveyance direction and longer in a direction (Y direction) orthogonal to the X direction, and the plurality of light source devices 10 are included in the heating module 100. These light source devices 10 are aligned in the X direction such that an axis (optical axis) along which the laser light 7 is emitted extends a direction (Z direction) orthogonal to the X and Y directions and such that a short-side direction of each light source device 10 coincides with the X direction. The laser light 7 emitted from each of the light source devices 10 is irradiated on a substantially rectangular irradiation area (projected region) 5 whose length in the X direction is longer than its length in the Y direction on the surface of the heating target 3 via the optical axis adjustment optical system 110, and the inside of the irradiation area 5 is irradiated with substantially uniform intensity (illuminance). Accordingly, the heating target 3 can be heated substantially uniformly by the heating device 2

Figure 2:
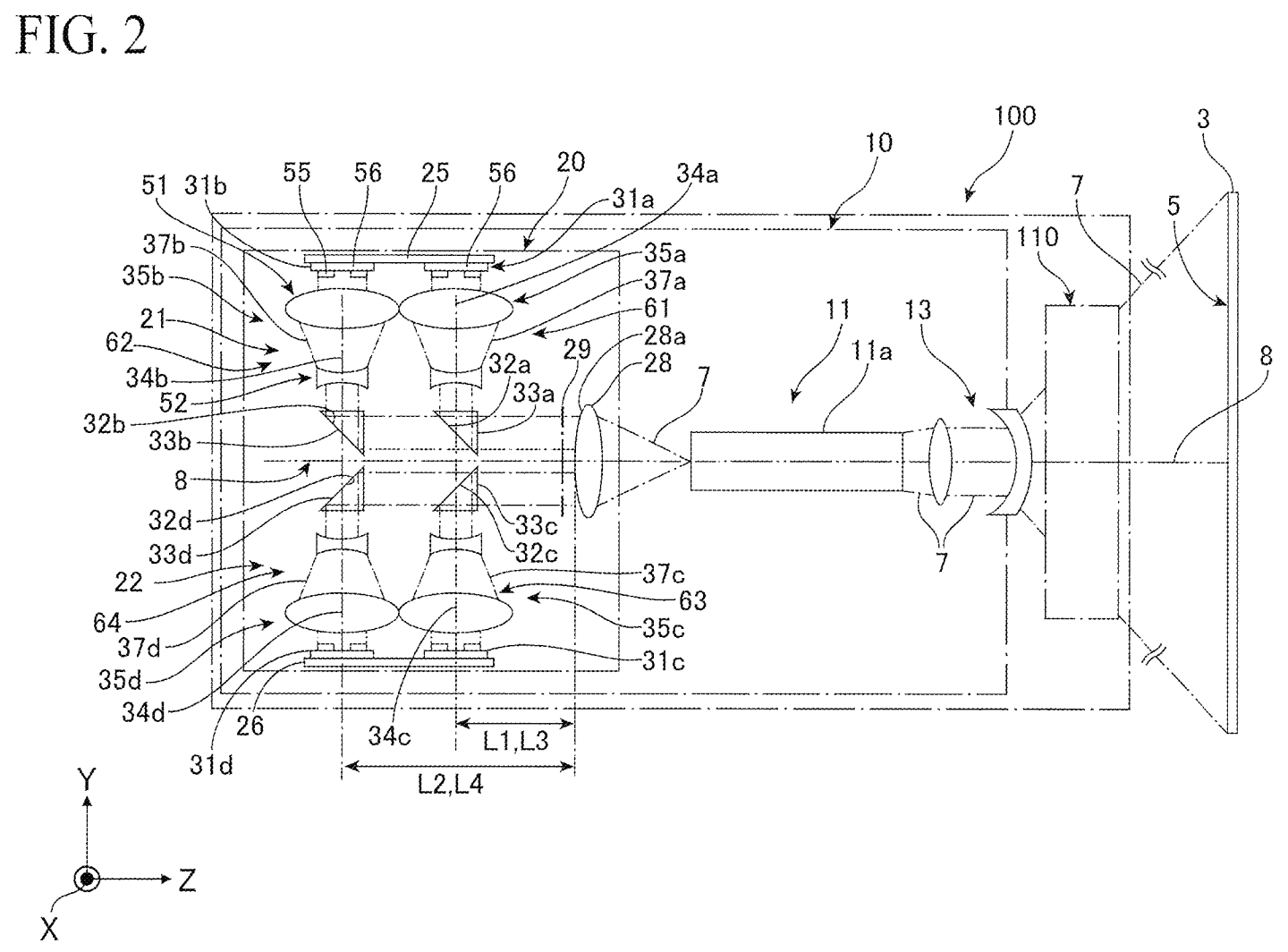

FIG. 2 illustrates an example of the light source device 10. FIG. 2 is a plan view perpendicular to an X-axis. The light source device 10 includes a laser module 20 including a plurality of laser light sources, a homogenizing optical system 11 that further homogenizes the laser light 7 exited a condenser lens 28 of the laser module 20 and causes the homogenized laser light to exit it, and a projection optical system 13 that projects the laser light 7 exited the homogenizing optical system 11 toward the irradiation area 5 via the optical axis adjustment optical system 110. Examples of the homogenizing optical system 11 include a component including a rod integrator 11*a*. The rod integrator 11*a* has a cylindrical shape, and propagates a laser light incident on the incident surface thereof toward an emission surface while totally reflecting the laser light at the inner wall thereof. Thus, a laser light having a uniform light amount over the entire area of the emission surface is emitted from the emission surface of the homogenizing optical system 11. In another example, in the homogenizing optical system 11, reflection of the laser light by the rod integrator 11*a* is not a total reflection. The homogenizing optical system 11 can be combined with other optical elements such as a scattering plate and a fly-eye lens, and can be configured satisfying desired homogenization requirements. The projection optical system 13 can be a lens system including one or more lenses and can include other optical elements such as mirrors or prisms to bend an optical axis 8.

Figure 3:
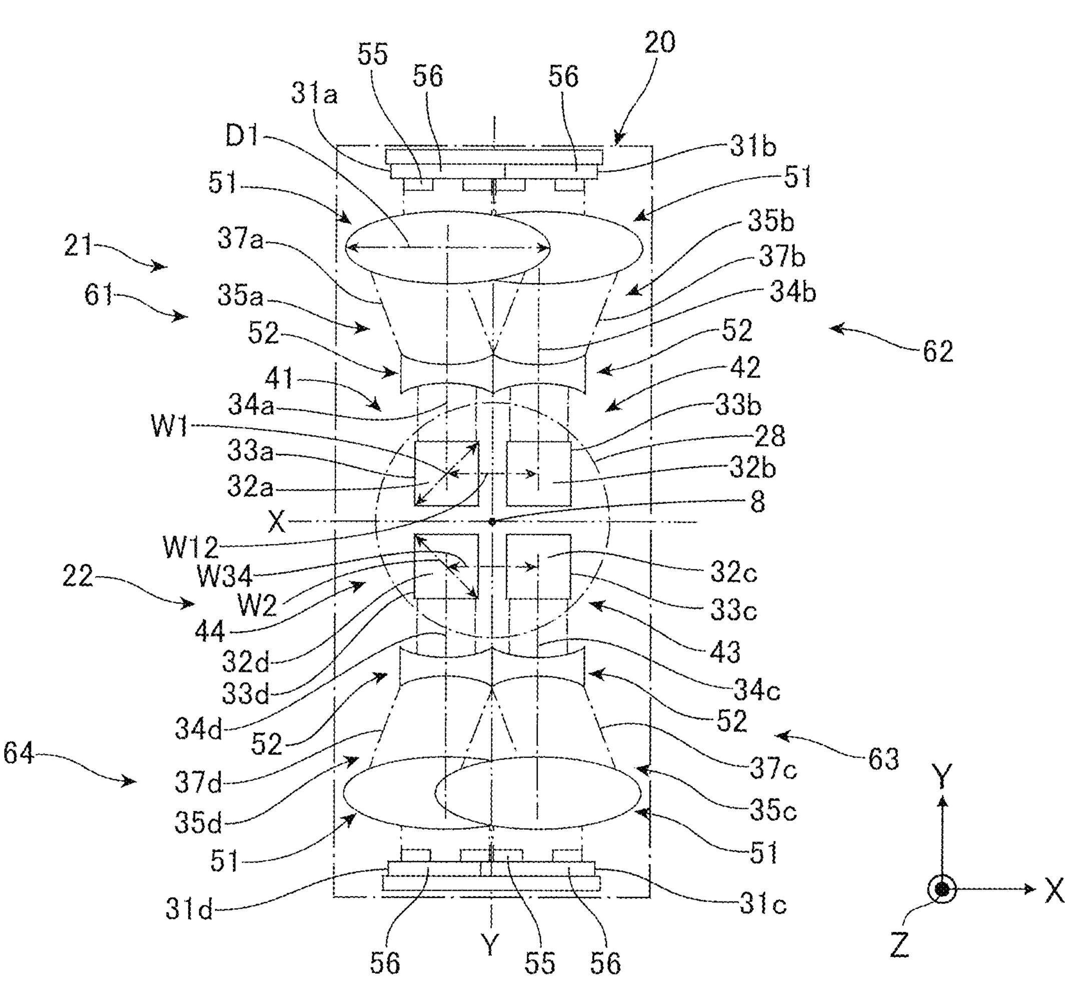
FIG. 3 is a diagram illustrating an example of a laser module in an XY plane (plan view).
Figure 4:
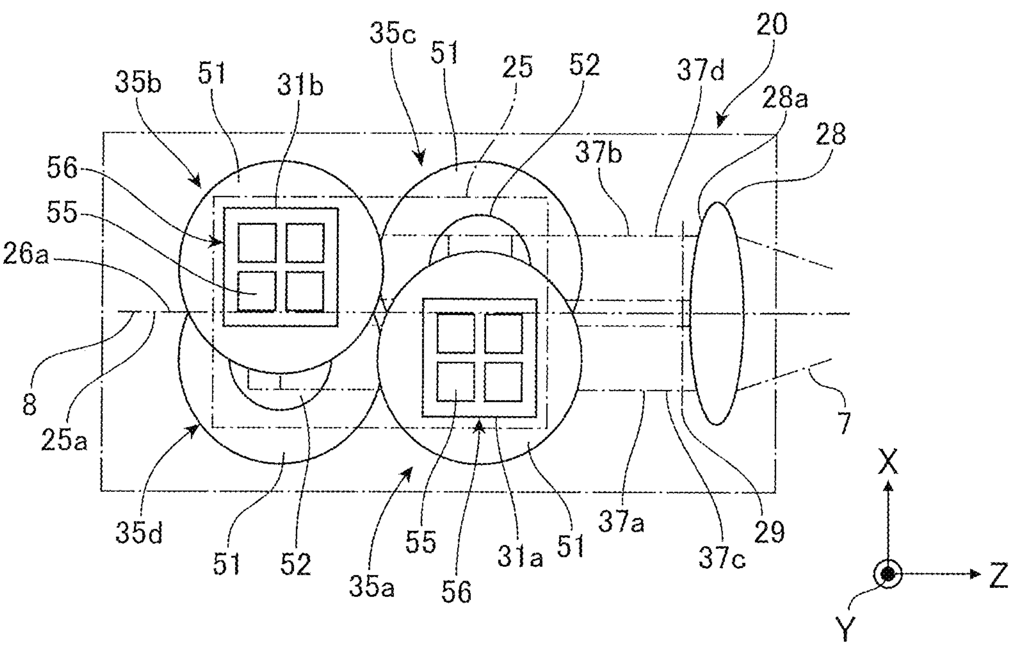
FIG. 4 is a top view of the laser module.

FIG. 3 illustrates a configuration of the laser module 20 viewed from a plane perpendicular to the optical axis 8 (XY plane in plan view), and FIG. 4 illustrates a configuration of the laser module 20 viewed from a plane perpendicular to a Y axis (ZX plane in plan view). The laser module 20 includes a first laser light source 31*a* that emits a first laser light 37*a*, a second laser light source 31*b* that emits a second laser light 37*b*, a third laser light source 31*c* that emits a third laser light 37*c*, a fourth laser light source 31*d* that emits a fourth laser light 37*d*, and a condenser lens (condenser lens) 28. The condenser lens 28 can be constituted by one lens or a plurality of lenses.

The laser module 20 further includes a first reflective element 33*a*, a second reflective element 33*b*, a third reflective element 33*c*, and a fourth reflective element 33*d*. When a plan view (XY plane) of the laser module 20 taken in a direction along the optical axis 8 of the condenser lens 28 is divided into a first quadrant 41, a second quadrant 42, a third quadrant 43, and a fourth quadrant 44 with the position of the optical axis 8 serving as the origin of the quadrants, the first reflective element 33*a* is disposed in a range of the first quadrant 41, the second reflective element 33*b* is disposed in a range of the second quadrant 42, the third reflective element 33*c* is disposed in a range of the third quadrant 43, and the fourth reflective element 33*d* is disposed in a range of the fourth quadrant 44. An example of the reflective elements 33*a* to 33*d* is a prism or a mirror. As illustrated in FIG. 2, the first reflective element 33*a* has a first reflecting surface 32*a* located at a first distance L1 along the optical axis 8 from the condenser lens 28 such that the reflection direction of the first laser light 37*a* is directed toward the condenser lens 28 along the optical axis 8. The second reflective element 33*b* has a second reflecting surface 32*b* located at a second distance L2 along the optical axis 8 from the condenser lens 28 such that the reflection direction of the second laser light 37*b* is directed toward the condenser lens 28 along the optical axis 8. Similarly, the third reflective element 33*c* has a third reflecting surface 32*c* located at a third distance L3 along the optical axis 8 from the condenser lens 28 such that the reflection direction of the third laser light 37*c* is directed toward the condenser lens 28 along the optical axis 8. The fourth reflective element 33*d* has a fourth reflecting surface 32*d* disposed at a fourth distance L4 along the optical axis 8 from the condenser lens 28 such that the reflection direction of the fourth laser light 37*d* is directed toward the condenser lens 28 along the optical axis 8.

As illustrated in FIG. 2, the first distance L1 is typically a distance along the optical axis 8 from the center of the first reflecting surface 32*a* to a surface 28*a* of the condenser lens 28 on the first reflecting surface 32*a* side (hereinafter referred to as an "inner surface 28*a*"). Similarly, the second distance L2 is typically a distance along the optical axis 8 from the center of the second reflecting surface 32*b* to the inner surface 28*a* of the condenser lens 28. The third distance L3 is typically a distance along the optical axis 8 from the center of the third reflecting surface 32*c* to the inner surface 28*a* of the condenser lens 28. The fourth distance L4 is typically a distance along the optical axis 8 from the center of the fourth reflecting surface 32*d* to the inner surface 28*a* of the condenser lens 28. In this example, the first distance L1 and the third distance L3 are equal to each other, and the second distance L2 and the fourth distance L4 are equal to each other. The second distance L2 is set longer than the first distance L1, and the fourth distance L4 is set longer than the third distance L3. The relationship among these distances L1 to L4 is not limited to the above, but the relationship described above is a preferable example for providing a compact laser module 20.

The laser module 20 further includes a first afocal system 35*a* disposed on a first optical path 34*a* between the first laser light source 31*a* and the first reflecting surface 32*a* such that the first laser light 37*a* exits it toward the first reflecting surface 32*a*. Similarly, the laser module 20 includes a second afocal system 35*b* disposed on a second optical path 34*b* from the second laser light source 31*b* to the second reflecting surface 32*b* such that the second laser light

37*b* exits it toward the second reflecting surface 32*b*. The laser module 20 includes a third afocal system 35*c* disposed on a third optical path 34*c* from the third laser light source 31*c* to the third reflecting surface 32*c* such that the third laser light 37*c* exits it toward the third reflecting surface 32*c*. The laser module 20 includes a fourth afocal system 35*d* disposed on a fourth optical path 34*d* from the fourth laser light source 31*d* to the fourth reflecting surface 32*d* such that the fourth laser light 37*d* exits it toward the fourth reflecting surface 32*d*.

The first to fourth afocal systems 35*a* to 35*d* can have a common configuration and include, for example, lenses 51 having a positive power and disposed on the sides of the laser light sources 31*a* to 31*d*, respectively, and lenses 52 having a negative power and disposed on the sides of the reflecting surfaces 32*a* to 32*d*, respectively.

The lens 51 having a positive power can have a configuration of one lens having a positive power, a configuration of a plurality of lenses, or a combination of a lens having a positive power and a lens having a negative power. The lens 52 having a negative power can have a configuration of one lens having a negative power, a configuration of a plurality of lenses, or a combination of a lens having a negative power and a lens having a positive power. The afocal system including the lens 51 having a positive power and the lens 52 having a negative power has a relatively short overall length and is one example of a system suitable for providing a compact laser module 20. The configurations of the first to fourth afocal systems 35*a* to 35*d* are not limited to a lens system and can be a combination of mirror surfaces or a combination of a mirror surface and a lens, or can be a configuration including other optical elements such as a prism, as long as the configurations serve as non-focus optical systems from which the respective laser lights (each being a substantially parallel laser light bundle) 37*a* to 37*d*, incident from the respective laser light sources 31*a* to 31*d*, exit as substantially parallel light bundles.

Each of the first to fourth laser light sources 31*a* to 31*d* can contain a single semiconductor laser element (laser diode) or a plurality of semiconductor laser elements (laser diodes). Each of the first to fourth laser light sources 31*a* to 31*d* of this example includes, for example, an LD assembly 56 containing four LD packages 55, in each of which a plurality of semiconductor laser elements are arranged in four rows and seven columns and packaged. Accordingly, each of the first to fourth afocal systems 35*a* to 35*d* causes a respective one of the first laser light (laser light bundle) 37*a* to the fourth laser light (laser light bundle) 37*d*, in each of which the laser beams emitted from the 112 semiconductor laser elements are concentrated and collimated, to be incident on a corresponding one of the reflecting surfaces 32*a* to 32*d*. Therefore, the laser module 20 can concentrate laser beams emitted from the 448 semiconductor laser elements via the condenser lens 28 and emit the concentrated laser beams as the laser light 7.

Figure 5:
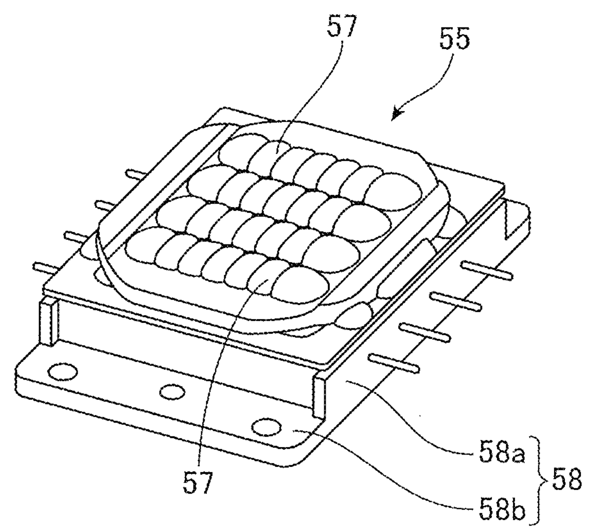
FIG. 5 is a diagram illustrating an example of a laser diode (LD) package.

FIG. 5 illustrates an example of the LD package 55. The LD package 55 includes a base 58 and a collimating lens 57 illustrated in FIG. 5.

The base 58 can be formed using, for example, a metal material such as iron, an iron alloy, or copper. The substrate 58 can also be formed using a ceramic material such as AlN, SiC, or SiN. The base 58 can also be formed by forming a base portion 58*b* and a sidewall portion 58*a* using different materials and then bonding the base portion 58*b* and the sidewall portion 58*a* together. A metal lead pin can be provided on the sidewall portion 58*a* to be used as a part of a wiring. An insulating member can be provided between the sidewall portion 58*a* and the lead pin to prevent short-circuits.

The collimating lens 57 includes a plurality of lens surfaces arranged in a matrix of M rows and N columns (M is a natural number and M≥2 and N is a natural number and N≥3). The lens portion corresponds to the number of semiconductor laser elements to be mounted. The collimating lens 57 can be formed using a material having transmissivity such as glass or synthetic quartz.

The semiconductor laser elements are disposed in a matrix of M rows N columns. In the example of FIG. 5, the semiconductor laser elements are disposed in a matrix of four rows and seven columns. The emission peak wavelength of the semiconductor laser elements can be, for example, in a range from 420 nm to 750 nm. The semiconductor laser elements can emit a blue laser light and have an emission peak wavelength in a range from 420 nm to 490 nm. The semiconductor laser elements can be multimode lasers to increase output. The semiconductor laser element can include a first semiconductor laser element having an emission peak wavelength of a first wavelength, and a second semiconductor laser element having an emission peak wavelength of a second wavelength different from the first wavelength. In the processing apparatus illustrated in FIG. 1, when two or more kinds of substances are included in the heating target 3, an absorption coefficient can be different for each substance. In this case, by appropriately adjusting the first wavelength and the second wavelength, the heating target 3 can be efficiently heated.

The light source device 10 includes the laser module 20 in which the first reflecting surface 32*a* to the fourth reflecting surface 32*d* are disposed respectively corresponding to the first quadrant 41 to the fourth quadrant 44 around the optical axis 8 of the condenser lens 28. At the first reflecting surface 32*a* to the fourth reflecting surface 32*d*, the laser beams emitted from the plurality of semiconductor laser elements through each of the first afocal system 35*a* to the fourth afocal system 35*d* are concentrated (bundled). Thus, the first laser light 37*a* to the fourth laser light 37*d* collimated to a small diameter are reflected toward the condenser lens 28 along the optical axis 8. Accordingly, the plurality of laser lights 37*a* to 37*d* dispersed in a narrow range (range in which a beam diameter is small) around the optical axis 8 can be incident on the condenser lens 28. The plurality of laser lights 37*a* to 37*d* via the condenser lens 28 have a high energy density. When the laser lights 37*a* to 37*d* pass through the homogenizing optical system 11, the laser light 7 having high energy density and high homogeneity is emitted.

In the laser module 20, with the first reflecting surface 32*a* to the fourth reflecting surface 32*d* disposed in the first quadrant 41 to the fourth quadrant 44, respectively, with the position of the optical axis 8 in the plan view (XY plane) serving as the origin, the laser lights 37*a* to 37*d* input to the condenser lens 28 can be distributed to the first quadrant 41 to the fourth quadrant 44, respectively, and the coherent laser lights 37*a* to 37*d* can be incident on the condenser lens 28 while avoiding overlapping thereof. Moreover, the first reflecting surface 32*a* to the fourth reflecting surface 32*d* are located in the first quadrant 41 to the fourth quadrant 44, respectively, so that respective optical systems can be disposed in each of the first quadrant 41 to the fourth quadrant 44. Therefore, the flexibility of the arrangement of the optical systems that cause the first laser light 37*a* to the fourth laser light 37*d* to be incident on the first reflecting surface 32*a* to the fourth reflecting surface 32*d*, respectively, is increased, and the laser module 20 including the optical system for integrating laser beams from a large number of laser elements and emitting the laser lights 37*a* to 37*d* with high density can be made compact.

For example, the first reflecting surface 32*a* to the fourth reflecting surface 32*d* allow the first laser light source 31*a* to the fourth laser light source 31*d* to be disposed at positions away from the optical axis 8, typically, at positions orthogonal to the optical axis 8. Specifically, the optical axis 8 is orthogonal to the surface of a first substrate 25 to be described below on which the first laser light source 31*a* and the second laser light source 31*b* are disposed. The optical axis 8 is orthogonal to the surface of a second substrate 26 on which the third laser light source 31*c* and the fourth laser light source 31*d* are disposed. Moreover, the optical paths 34*a* to 34*d* respectively including the afocal systems 35*a* to 35*d*, which respectively causes laser lights from the laser light sources 31*a* to 31*d* to be collimated and to be incident on the reflecting surfaces 32*a* to 32*d*, can be orthogonal to the optical axis 8. Accordingly, the laser module 20, which is configured to concentrate light beams from a large number of laser elements and to emit the concentrated light beams, can be reduced in length in the direction (Z direction) of the optical axis 8.

In addition, the laser lights 37*a* to 37*d* are collimated by the afocal systems 35*a* to 35*d*, respectively, whereby, even if the distance L1 to L4 from the condenser lens 28 to the respective reflecting surfaces 32*a* to 32*d* are changed, the laser lights 37*a* to 37*d* can be incident on the condenser lens 28 without substantial change in the areas of the light bundles that reach the condenser lens 28. Accordingly, the positions (distances) L1 to L4 of the reflecting surfaces 32*a* to 32*d* can have less influence on the condenser lens 28, and the selectivity of the positions (distances) L1 to L4 of the reflecting surfaces 32*a* to 32*d* can be improved. Consequently, when the clearance in the direction (Z direction) of the optical axis 8 is secured, as illustrated in FIG. 3, in plan view (XY plane), at least some of the optical paths 34*a* to 34*d* including the afocal systems 35*a* to 35*d* from the plurality of laser light sources 31*a* to 31*d* respectively to the reflecting surfaces 32*a* to 32*d* can overlap each other. Even when at least some of the optical paths 34*a* and 34*b* or at least some of the optical paths 34*c* and 34*d* overlap each other, the laser lights 37*a* to 37*d* are reduced in size and collimated by the afocal systems 35*a* to 35*d*, respectively, and are incident on the condenser lens 28. This makes it possible to provide the laser module 20 and the light source device 10 that are more compact and can emit a laser light in which the plurality of laser lights 37*a* to 37*d* are concentrated (bundled) via the condenser lens 28.

The laser module 20 of this example includes an upper module 21 disposed on an upper side (+ direction on Y-axis) of the optical axis (Z-axis) 8 including the first optical path 34*a* and the second optical path 34*b* respectively including the first afocal system 35*a* and the second afocal system 35*b*, and a lower module 22 disposed on a lower side (− direction on the Y-axis) of the optical axis 8 including the third optical path 34*c* and the fourth optical path 34*d* respectively including the third afocal system 35*c* and the fourth afocal system 35*d*. With first optical path 34*a* to the fourth optical path 34*d* established separately in the upper and lower sides, the length of the laser module 20 in the direction (Z direction) of the optical axis 8 can be reduced. The optical paths 34*a* to 34*d* respectively including the afocal systems 35*a* to 35*d* can also be concentrated on one side, for example, the upper side (for example, + direction on the Y-axis) with respect to the optical axis 8.

Moreover, by changing the first distance L1 of the first reflecting surface 32*a* and the second distance L2 of the second reflecting surface 32*c*, optical elements such as lenses included in the first optical path 34*a* and the second optical path 34*b* and the laser light sources 31*a* and 31*b* can overlap each other in plan view (XY plane) as illustrated in FIG. 3. As an example, as illustrated in FIGS. 3 and 4, when the second distance L2 is longer than the first distance L1, the largest lenses 51 of the afocal systems 35*a* and 35*b* can partially overlap each other in the XY plane. Alternatively, the largest lenses 51 of the afocal systems 35*a* and 35*b* can partially overlap each other in the YZ plane. The laser light sources 31*a* and 31*b* can also partially overlap each other in the XY plane and/or the YZ plane. Similarly, the third distance L3 of the third reflecting surface 32*c* and the fourth distance L4 of the fourth reflecting surface 32*d* can be changed. For example, with the fourth distance L4 is longer than the third distance L3, the laser light source 31*c* and the laser light source 31*d* and optical elements such as lenses included in the third optical path 34*c* and the fourth optical path 34*d* can overlap each other in plan view (XY plane). Therefore, the distances of the laser module 20 in the Z direction and the X direction can be reduced, and the laser module 20 that is more compact and the light source device 10 including the laser module 20 can be provided.

As described above, the distances L1 to L4 between the condenser lens 28 and the first reflecting surface 32*a* to the fourth reflecting surface 32*d*, respectively, can be flexibly set. An example of the laser module 20 having a compact and highly symmetric arrangement is the laser module 20 in which the first distance L1 between the first reflecting surface 32*a* of the upper module 21, which is disposed in the first quadrant 41, and the condenser lens 28 is equal to the third distance L3 between the third reflecting surface 32*c* of the lower module 22, which is disposed in the third quadrant 43, and the condenser lens. Further, in this laser module 20, the second distance L2 between the second reflecting surface 32*b* of the upper module 21, which is disposed in the second quadrant 42, and the condenser lens 28 is equal to the fourth distance L4 between the fourth reflecting surface 32*d* of the lower module 22, which is disposed in the fourth quadrant 44, and the condenser lens. In the laser module 20, an optical path length of the first optical path 34*a*, including the first afocal system 35*a*, from the first reflecting surface 32*a* to the first laser light source 31*a* can be equal to an optical path length of the third optical path 34*c*, including the third afocal system 35*c*, from the third reflecting surface 32*c* to the third laser light source 31*c*. In addition, an optical path length of the second optical path 34*b*, including the second afocal system 35*b*, from the second reflecting surface 32*b* to the second laser light source 31*b* can be equal to an optical path length of the fourth optical path 34*d* including the fourth afocal system 35*d* from the fourth reflecting surface 32*d* to the fourth laser light source 31*d*.

Moreover, in the laser module 20, in a plan view (XY plane), the first reflecting surface 32*a* and the third reflecting surface 32*c* can be disposed at positions of point symmetry (first point symmetry) about the optical axis 8, and the second reflecting surface 32*b* and the fourth reflecting surface 32*d* can be disposed at positions of point symmetry (second point symmetry) about the optical axis 8. In the laser module 20, a configuration of a first optical system 61 of a path from the first laser light source 31*a* to the condenser lens 28, including the optical path length, is the same as (that is, identical to) a configuration of a third optical system 63 of a path from the third laser light source 31*c* to the condenser lens 28, and the first laser light 37*a* and the third laser light 37*c* emitted from them are incident on the condenser lens 28 in point symmetry about the optical axis 8. In addition, a configuration of a second optical system 62 of a path from the second laser light source 31*b* to the condenser lens 28, including the optical path length, is the same as (that is, identical to) a configuration of a fourth optical system 64 of a path from the fourth laser light source 31*d* to the condenser lens 28, and the second laser light 37*b* and the fourth laser light 37*d* emitted from them are incident on the condenser lens 28 in point symmetry about the optical axis 8. This facilitates the homogenization by the homogenizing optical system 11. This will be described in detail below.

Figure 6:
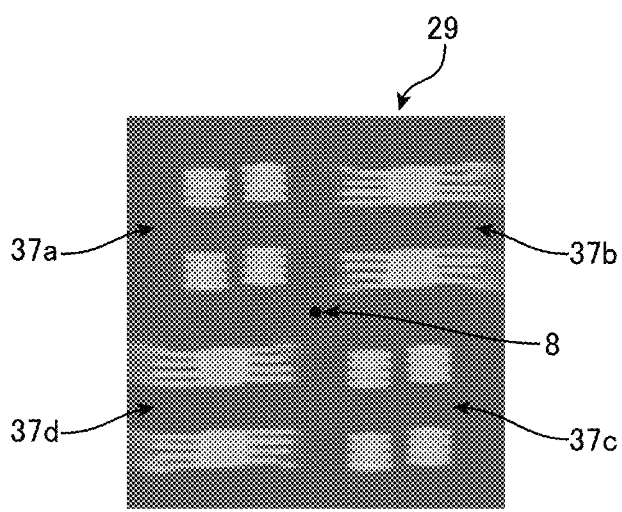
FIG. 6 is an image showing a simulation result of an example of states of laser lights on a multiplexing surface.

FIG. 6 is a simulation result showing an example of the illuminance distribution of the laser lights 37*a* to 37*d* on a multiplexing surface 29. As shown in FIG. 6, on the multiplexing surface 29 on an upstream side of the condenser lens 28, the first laser light 37*a* and the third laser light 37*c* that are incident from the optical paths having a common configuration including the optical path length are at the same magnification. Therefore, laser beams from a large number of laser diodes have a common intensity distribution as a bundle of laser beams. In addition, the second laser light 37*b* and the fourth laser light 37*d* that are incident from the optical paths having a common configuration including the optical path length are at the same magnification. Therefore, laser beams from a large number of laser diodes have a common intensity distribution as a bundle of light beams. On the other hand, the distances L1 and L3 are different from the distances L2 and L4, so that the spread of the first laser light 37*a* and the third laser light 37*c* is different from the spread of the second laser light 37*b* and the fourth laser light 37*d*. By combining light bundles in which two sets of laser lights having different distributions, that is, a set of the laser lights 37*a* and 37*c* and a set of the laser lights 37*b* and 37*d* are arranged in point symmetry, by the condenser lens 28, the laser light 7 having higher homogeneity can be emitted from the laser module 20.

For example, a state in which the illuminance distributions of the first laser light 37*a* and the fourth laser light 37*d* are reversed from those described above would be considered. In that case, due to the asymmetry of the illuminances on the multiplexing surface 29, even though the first laser light 37*a* to the fourth laser light 37*d* pass through the homogenizing optical system 11, there would be unevenness in the illuminance distribution.

Moreover, locations of the first reflecting surface 32*a* and the third reflecting surface 32*c* at the first point-symmetrical positions about the optical axis 8 and locations of the second reflecting surface 32*b* and the fourth reflecting surface 32*d* at the second point-symmetrical positions about the optical axis 8 can be respectively interchangeable with each other in the plan view (XY plane). That is, the position of the first reflecting surface 32*a* and the position of the second reflecting surface 32*b* around the optical axis 8 can be interchangeable (replaceable) with each other, and the position of the third reflecting surface 32*c* and the position of the fourth reflecting surface 32*d* can be interchangeable (replaceable) with each other. In one typical example, the arrangement of the first reflecting surface 32*a* and the third reflecting surface 32*c* can be symmetrical to the arrangement of the second reflecting surface 32*b* and the fourth reflecting surface 32*d* with respect to the X-axis, and the arrangement of the first reflecting surface 32*a* and the second reflecting surface 32*b* can be symmetrical to the arrangement of the third reflecting surface 32*c* and the fourth reflecting surface 32*d* with respect to the Y-axis. When the first to fourth laser lights 37*a* to 37*d* enters the condenser lens 28 in a state of high symmetry around the optical axis 8 and are combined (multiplexed), the laser light 7 with higher homogeneity can be emitted from the laser module 20.

With these reflecting surfaces 32*a* to 32*d* located close to the optical axis 8 in a state of high symmetry, the laser lights 37*a* to 37*d* can be incident on the condenser lens 28 in a state of high density. Therefore, these laser lights 37*a* to 37*d* can be combined by the more compact condenser lens 28, and the more compact laser module 20 can be provided.

As illustrated in FIG. 3, in a plan view (XY plane), a distance W12 between the center of a use region of the first reflecting surface 32*a* and the center of a use region of the second reflecting surface 32*b* can be larger than the maximum diameter of each of the use region of the first reflecting surface and the use region of the second reflecting surface, for example, a diagonal distance W1 of each of these reflecting surfaces, and can be smaller than the maximum value of a maximum effective diameter of the first afocal system 35*a* and a maximum effective diameter of the second afocal system, for example, a diameter D1 of the lens 51 having a positive power. In addition, a distance W34 between the center of a use region of the third reflecting surface 32*c* and the center of a use region of the fourth reflecting surface 32*d* can be larger than the maximum diameter of each of the use region of the third reflecting surface 32*c* and the use region of the fourth reflecting surface 32*d*, for example, a diagonal distance W2 of each of these reflecting surfaces, and can be smaller than the maximum value of a maximum effective diameter of the third afocal system 35*c* and a maximum effective diameter of the fourth afocal system 35*d*, for example, the diameter D1 of the lens 51 having a positive power. Thus, even when the laser lights 37*a* to 37*d* are emitted at a high density, unintended interferences of the members are less likely to occur.

In the laser module 20, the first laser light source 31*a* and the second laser light source 31*b* can be equidistantly disposed along the Y-axis with respect to the first reflecting surface 32*a* and the second reflecting surface 32*b*, respectively, of the upper module 21. In addition, the third laser light source 31*c* and the fourth laser light source 31*d* can be equidistantly disposed along the Y-axis with respect to the third reflecting surface 32*c* and the fourth reflecting surface 32*d*, respectively, of the lower module 22. Therefore, the laser module 20 can further include the first substrate 25, which supports the first laser light source 31*a* and the second laser light source 31*b* of the upper module 21, and the second substrate 26, which supports the third laser light source 31*c* and the fourth laser light source 31*d* of the lower module 22, on the side opposite to the first substrate 25 with respect to the optical axis 8. The first substrate 25 and the second substrate 26 can be flat plates. The first laser light source 31*a* and the second laser light source 31*b* can be disposed on both sides of a first center line 25*a* of the first substrate 25 parallel to the optical axis 8. The third laser light source 31*c* and the fourth laser light source 31*d* can be disposed on both sides of a second center line 26*a* of the second substrate 26 parallel to the optical axis 8.

The first substrate 25 and the second substrate 26 can be heat dissipation substrates, substrates having high thermal conductivity such as aluminum, substrates provided with a heat sink, or substrates including a mechanism for forced cooling such as water cooling or air cooling.

In this way, the laser module 20 of this example is compact and can output the laser light 7 with high homogeneity in which laser beams from a large number of laser elements are concentrated (bundled). Consequently, the light source device 10 including the laser module 20 is not only suitable for illumination of a projector but also suitable as a light source device of the heating system 1 for a process such as drying and heat generation in which a laser light having an increased energy density is required. The laser module 20 of this example is relatively compact, in particular, in the X direction. Thus, for example, the width of the light source device 10 in the X direction as illustrated in FIG. 1 can be made equal to or less than the width of the conveying device 4 in the X direction. Thus, the heating system 1 is reduced in size.

Moreover, in the laser module 20 of this example, the first optical path 34*a* including the first afocal system 35*a* of the upper module 21 and the second optical path 34*b* including the second afocal system 35*b* partially overlap in + direction on the Y-axis, and the third optical path 34*c* including the third afocal system 35*c* of the lower module 22 and the fourth optical path 34*d* including the fourth afocal system 35*d* partially overlap in-direction on the Y-axis. Therefore, both the first substrate 25 on which the first laser light source 31*a* and the second laser light source 31*b* are mounted and the second substrate 26 on which the third laser light source 31*c* and the fourth laser light source 31*d* are mounted can have a rectangular shape which is shorter in the X direction and longer in the Z direction.

The laser module 20 including the upper module 21 and the lower module 22 has a rectangular shape which is shorter in the X direction and longer in the Y direction in the XY plane (plan view) and extends in the Z direction, and can have a rectangular parallelepiped shape which is short in the X direction as a whole. Therefore, the light source device 10 including the laser module 20 can be compactly disposed such that the X direction thereof is a short-side direction (short side). Consequently, as illustrated in FIG. 1, with the plurality of light source devices 10 disposed such that the short-side directions of the first substrate 25 and the second substrate 26 coincide with a direction perpendicular to the optical axis 8 in plan view (that is, the XZ plane) in which the X direction of the light source devices 10 is typically perpendicular to the conveyance direction (that is, the first direction), the heating module 100, which includes the plurality of light source devices 10 and can be disposed short and compact in the conveyance direction, can be provided. This allows for providing the heating device 2 that continuously irradiates the heating target 3 conveyed by the conveying device 4 with a plurality of laser lights 7 having high homogeneity.

Figure 7:
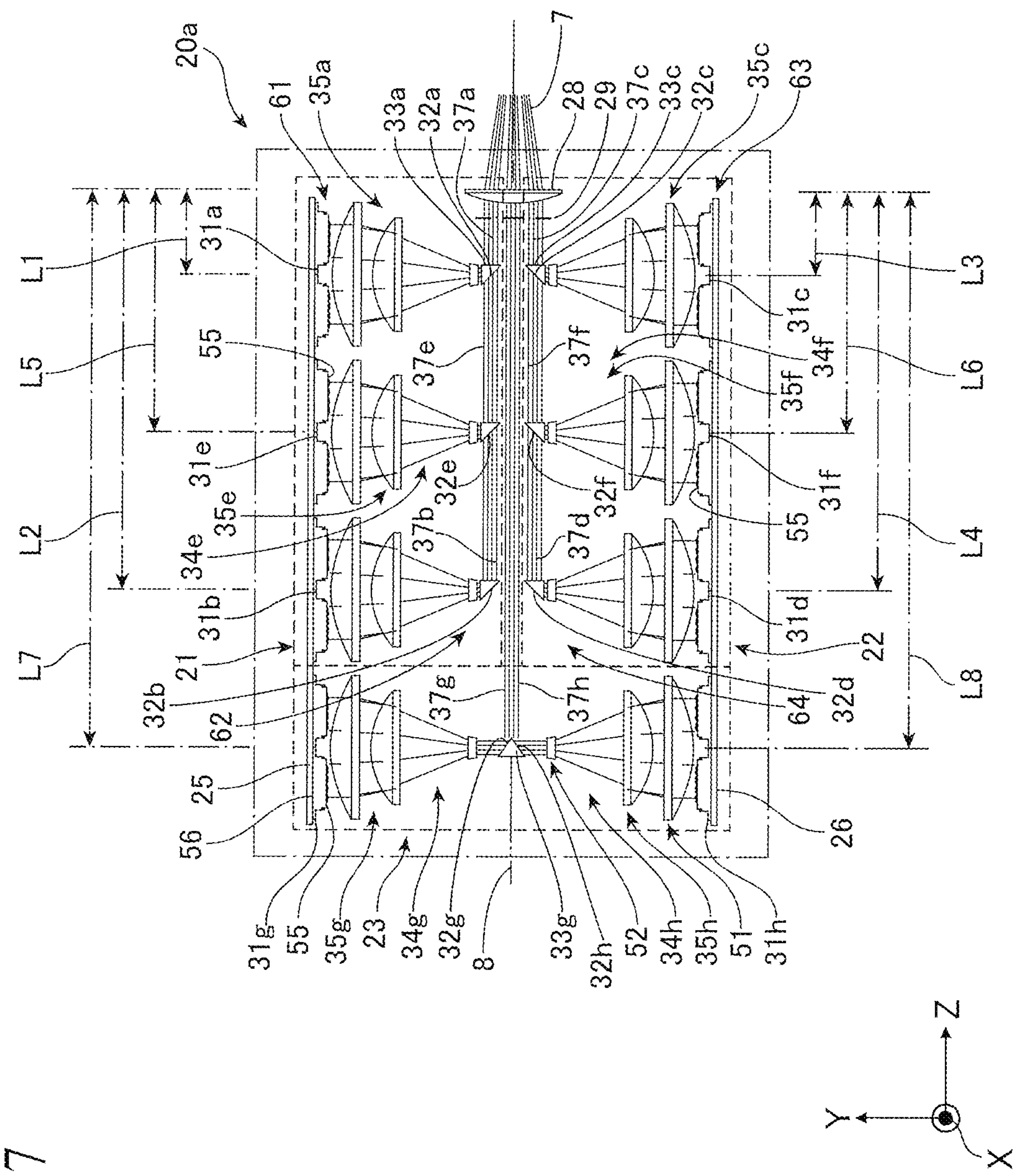
FIG. 7 is a diagram illustrating another outline of a laser module.
Figure 8:
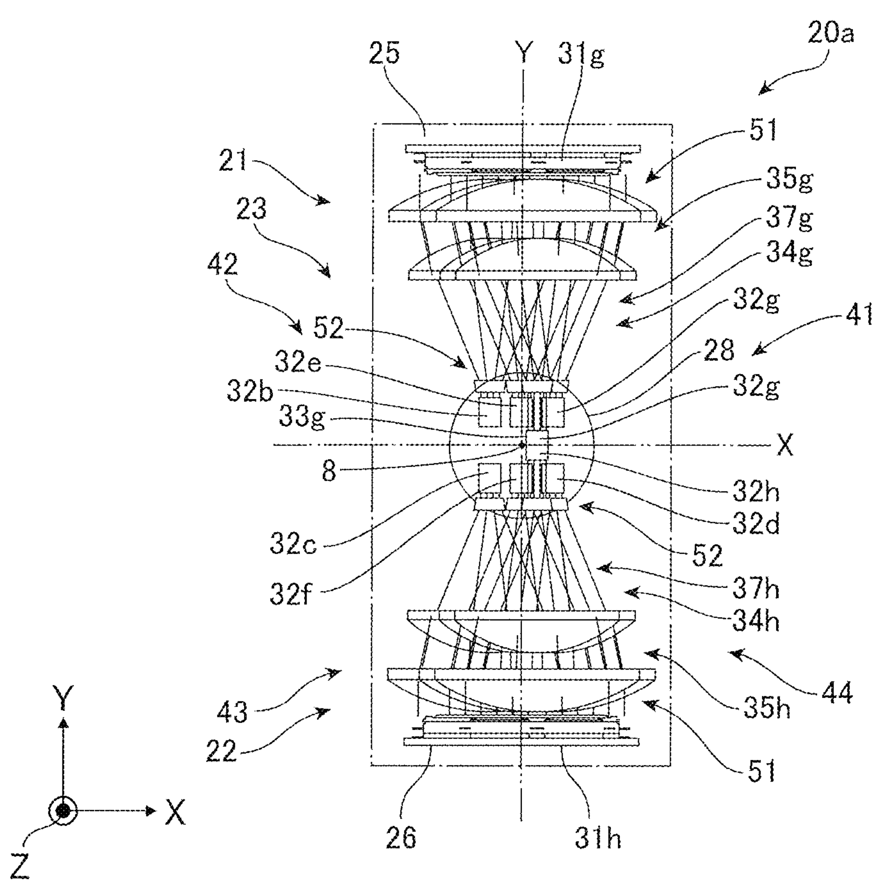
FIG. 8 is a diagram illustrating the laser module in an XY plane (plan view).
Figure 9:
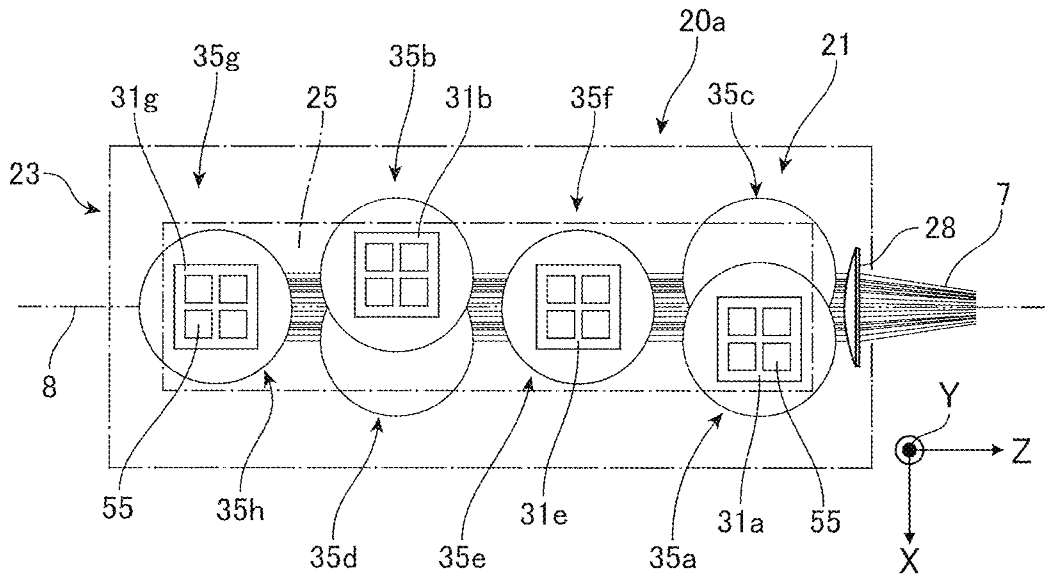
FIG. 9 is a top view of the laser module.

FIGS. 7 to 9 illustrate an example of a different laser module 20*a* of certain embodiments of the present disclosure. Like the laser module 20 illustrated in FIG. 2, the laser module 20*a* is also a module that can be included in the light source device 10 together with the homogenizing optical system 11 and the like. FIG. 7 illustrates a configuration of the laser module 20*a* viewed from a lateral side (X direction), FIG. 8 illustrates a configuration of the laser module 20*a* viewed from a rear side in a plane (Z direction, plan view, XY plane) perpendicular to the optical axis 8, and FIG. 9 illustrates a configuration of the laser module 20*a* viewed from above (Y direction). Configurations of the laser module 20*a* that are different from those of the laser module 20 will be described below. Configurations of the laser module 20*a* that are the same as that of the laser module 20 will not be specifically described below.

The laser module 20*a* differs from the laser module 20 in that the laser module 20*a* further has the following configuration. The laser module 20*a* includes a fifth laser light source 31*e* that emits a fifth laser light 37*e*, a sixth laser light source 31*f* that emits a sixth laser light 37*f*, a seventh laser light source 31*g* that emits a seventh laser light 37*g*, and an eighth laser light source 31*h* that emits an eighth laser light 37*h*. The laser module 20*a* further includes a fifth reflecting surface 32*e* located between the first reflecting surface 32*a* and the second reflecting surface 32*b* in plan view (XY plane) such that the reflection direction of the fifth laser light 37*e* is directed toward the condenser lens 28 along the optical axis 8, and a sixth reflecting surface 32*f* located between the third reflecting surface 32*c* and the fourth reflecting surface 32*d* in plan view (XY plane) such that the reflection direction of the sixth laser light 37*f* is directed toward the condenser lens 28 along the optical axis 8. The fifth reflecting surface 32*e* is one of surfaces of a fifth reflective element 33*e*. The sixth reflecting surface 32*f* is one of surfaces of a sixth reflective element 33*f*. Moreover, the laser module 20*a* includes a fifth afocal system 35*e* disposed on a fifth optical path 34*e* from the fifth laser light source 31*e* to the condenser lens 28 such that the fifth laser light 37*e* exits toward the fifth reflecting surface 32*e*, and a sixth afocal system 35*f* disposed on a sixth optical path 34*f* from the sixth laser light source 31*f* to the condenser lens 28 such that the sixth laser light 37*f* exits toward the sixth reflecting surface 32*f*.

The fifth laser light source 31*e* constitutes the upper module 21 together with the first laser light source 3*a* and the second laser light source 31*b*, and the fifth afocal system 35*e* from the fifth laser light source 31*e* to the fifth reflecting surface 32*e* is included in the upper module 21. In the laser module 20*a* of this example, the fifth reflecting surface 32*e* is disposed at a position that allows a distance (fifth distance) L5 along the optical axis 8 is equal to or longer than the first distance L1 and equal to or shorter than the second distance L2. The distance L5 between the fifth reflecting surface 32*e* and the condenser lens 28 can be shorter than the first distance L1 or longer than the second distance L2.

The sixth laser light source 31*f* constitutes the lower module 22 together with the third laser light source 31*c* and the fourth laser light source 31*d*, and the sixth afocal system 35*f* from the sixth laser light source 31*f* to the sixth reflecting surface 32*f* is included in the lower module 22. In the laser module 20*a* of this example, the sixth reflecting surface 32*f* is disposed at a position where a distance (sixth distance) L6 along the optical axis 8 is equal to the fifth distance L5, and is equal to or longer than the third distance L3 and equal to or shorter than the fourth distance L4. The distance L6 between the sixth reflecting surface 32*f* and the condenser lens 28 can be shorter than the third distance L3 or longer than the fourth distance L4. Although the fifth distance L5 and the sixth distance L6 need not be equal to each other, an optical path from the fifth laser light source 31*e* to the fifth reflecting surface 32*e* and an optical path from the sixth laser light source 31*f* to the sixth reflecting surface 32*f* are disposed at corresponding positions in the upper module 21 and the lower module 22, so that the laser module 20*a* that is more compact in the direction of the optical axis 8 (Z direction) can be provided.

The optical element 33*g* can be a mirror or a prism.

The laser module 20*a* includes a middle module 23 provided behind the upper module 21 and the lower module 22 (at a position away from the condenser lens 28). The middle module 23 includes a seventh laser light source 31*g* disposed at a seventh distance L7 on the upper side (+ side in the Y direction), and a seventh afocal system 35*g* disposed on a seventh optical path 34*g* from the seventh laser light source 31*g* to the condenser lens 28 such that a seventh laser light 37g exits toward a seventh reflecting surface 32g. The middle module 23 includes an eighth afocal system 35h disposed on an eighth optical path 34h from the eighth laser light source 31h disposed at an eighth distance L8 to the condenser lens 28 such that an eighth laser light 37h exits toward an eighth reflecting surface 32h. Each of the fifth afocal system 35e to the eighth afocal system 35h can include the lens 51 having a positive power and the lens 52 having a negative power similarly to the first afocal system 35a to the fourth afocal system 35d.

Similarly to the first laser light source 31a to the fourth laser light source 31d, each of the fifth laser light source 31e to the eighth laser light source 31h can include the LD assembly 56 containing four LD packages 55. The LD package 55 of this example includes a plurality of semiconductor laser elements arranged in four rows and seven columns. Consequently, in the laser module 20a of this example, laser beams emitted from a total of 896 semiconductor laser elements included in a total of 32 LD packages 55 can be concentrated (bundled) by the condenser lens 28 and emitted as the laser light 7.

Figure 10:
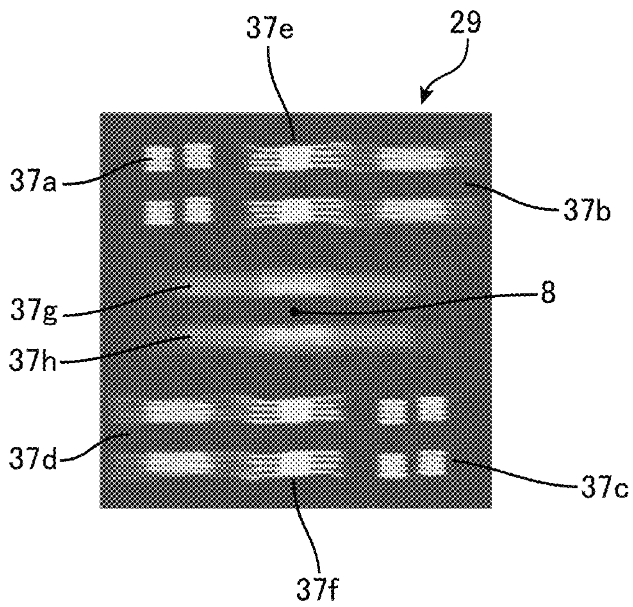
FIG. 10 is an image showing an example of states of laser lights on a multiplexing surface.

FIG. 10 illustrates an example of the illuminance distribution of the laser lights 37a to 37h projected (input) onto the multiplexing surface 29 on the upstream side of the condenser lens 28. The first laser light 37a and the third laser light 37c are incident on the multiplexing surface 29 in point symmetry, the second laser light 37b and the fourth laser light 37d are incident on the multiplexing surface 29 in point symmetry, the fifth laser light 37e is incident on a position between (intermediate position between) the position on which the first laser light 37a is incident and the position on which the second laser light 37b is incident, the sixth laser light 37f is incident on a position between (intermediate position between) the position on which the third laser light 37c is incident and the position on which the fourth laser light 37d is incident, the seventh laser light 37g is incident on a position between the position on which the first laser light 37a is incident and the position on which the second laser light 37b is incident, and the eighth laser light 37h is incident on a position between the position on which the second laser light 37b is incident and the position on which the fourth laser light 37d is incident. Consequently, the first laser light 37a to the eighth laser light 37h enter the condenser lens 28 in an arrangement with high density (in a dense state) and high symmetry. Therefore, the laser light 7 with high density and high homogeneity can be emitted through the condenser lens 28.

In the laser module 20a, the first laser light source 31a, the fifth laser light source 31e, and the second laser light source 31b of the upper module 21 and the seventh laser light source 31g on the upper side of the middle module 23 can be aligned in the Z direction along the optical axis 8 so as to be concentrated in a narrow range in the X direction. Therefore, the laser light sources 31a, 31e, 31b, and 31g can be mounted on the common first substrate 25 that is long in the Z direction and short in the X direction, as in the laser module 20. Similarly, in the laser module 20a, the third laser light source 31c, the sixth laser light source 31f, and the fourth laser light source 31d of the lower module 22 and the eighth laser light source 31h on the lower side of the middle module 23 can be aligned in the Z direction along the optical axis 8 so as to be concentrated in a narrow range in the X direction. Therefore, these laser light sources 31c, 31f, 31d, and 31h can be mounted on the common second substrate 26 that is long in the Z direction and short in the X direction. The first substrate 25 and the second substrate 26 can have a heat dissipation function or a cooling function.

In the laser module 20a, 32 LD packages 55 can be disposed such that the array of 32 LD packages 55 is longer in the Z direction and shorter in the X direction. Therefore, the light source device 10 including the laser module 20a is compact in the X direction as a whole, includes a large number of LD packages 55, and can emit the laser light 7 with high density and higher homogeneity obtained by bundling laser beams from a large number of semiconductor laser elements.

Figure 11A:
FIG. 11A is an image showing an example of a state of an irradiation area.

FIG. 11A is a simulation result of an example of the illuminance distribution of a laser light emitted from the light source device 10 when the illuminance distribution of the laser lights 37a to 37h on the multiplexing surface 29 is as shown in FIG. 10. FIG. 11A is an example of an irradiation area 5 exhibited by the laser light 7 emitted from the light source device 10 including the laser module 20 in which the first reflecting surface 32a and the third reflecting surface 32c are arranged rotationally symmetrically and the second reflecting surface 32b and the fourth reflecting surface 32d are arranged rotationally symmetrically.

Figure 11B:
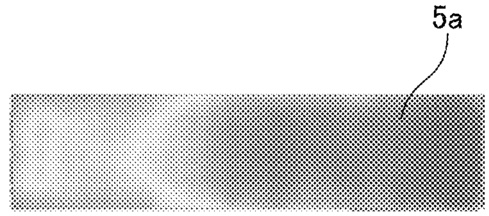
FIG. 11B is an image showing an example of a state of an irradiation area.

FIG. 11B is an example of an irradiation area 5a exhibited by a laser light emitted from a light source device including a laser module in which the first reflecting surface 32a and the third reflecting surface 32c are arranged line-symmetrically and the second reflecting surface 32b and the fourth reflecting surface 32d are arranged line-symmetrically. That is, with respect to the illuminance distribution of FIG. 10, the first laser light 37a and the fourth laser light 37d are replaced with each other, and the illuminance distribution of FIG. 10 is horizontally inverted.

As shown in FIG. 11B, even in an example in which the first reflecting surface 32a and the third reflecting surface 32c are not disposed rotationally symmetrically and the second reflecting surface 32b and the fourth reflecting surface 32d are not disposed rotationally symmetrically, a laser light having a high uniformity ratio of about 92% can be emitted. However, by employing the rotational symmetry, as shown in FIG. 11A, a laser light having a higher uniformity ratio of about 98% can be emitted, and the heating target 3 can be more uniformly heated without unevenness. The uniformity ratio is obtained by measuring the illuminance distribution using an illuminance meter and calculating a minimum value/a maximum value of the obtained illuminance distribution×100(%).

What is claimed is:

1. A light source device comprising:
- a first laser light source configured to emit a first laser light;
- a second laser light source configured to emit a second laser light;
- a third laser light source configured to emit a third laser light;
- a fourth laser light source configured to emit a fourth laser light;
- a condenser lens;
- a first reflecting surface located at a first distance along an optical axis of the condenser lens from the condenser lens such that a reflection direction of the first laser light is directed toward the condenser lens along the optical axis;
- a second reflecting surface located at a second distance along the optical axis from the condenser lens such that a reflection direction of the second laser light is directed toward the condenser lens along the optical axis;
- a third reflecting surface located at a third distance along the optical axis from the condenser lens such that a reflection direction of the third laser light is directed toward the condenser lens along the optical axis;

a fourth reflecting surface located at a fourth distance along the optical axis from the condenser lens such that a reflection direction of the fourth laser light is directed toward the condenser lens along the optical axis;

a first afocal system disposed on a first optical path from the first laser light source to the first reflecting surface such that the first laser light exits toward the first reflecting surface;

a second afocal system disposed on a second optical path from the second laser light source to the second reflecting surface such that the second laser light exits toward the second reflecting surface;

a third afocal system disposed on a third optical path from the third laser light source to the third reflecting surface such that the third laser light exits toward the third reflecting surface; and a fourth afocal system disposed on a fourth optical path from the fourth laser light source to the fourth reflecting surface such that the fourth laser light exits toward the fourth reflecting surface, wherein, when a plan view taken in a direction along the optical axis is divided into a first quadrant, a second quadrant, a third quadrant, and a fourth quadrant with a position of the optical axis serving as an origin, the first reflecting surface is located in the first quadrant, the second reflecting surface is located in the second quadrant, the third reflecting surface is located in the third quadrant, and the fourth reflecting surface is located in the fourth quadrant.

2. The light source device according to claim 1, wherein the second distance is longer than the first distance, the fourth distance is longer than the third distance, at least a part of the first optical path and at least a part of the second optical path overlap each other in the plan view, and at least a part of the third optical path and at least a part of the fourth optical path overlap each other in the plan view.

3. The light source device according to claim 2, wherein the first distance and the third distance are equal to each other, the second distance and the fourth distance are equal to each other, an optical path length of the first optical path and an optical path length of the third optical path are equal to each other, an optical path length of the second optical path and an optical path length of the fourth optical path are equal to each other, the first reflecting surface and the third reflecting surface are located at first point-symmetrical positions about the optical axis in the plan view, and the second reflecting surface and the fourth reflecting surface are located at second point-symmetrical positions about the optical axis in the plan view.

4. The light source device according to claim 3, wherein the first point-symmetrical positions and the second point-symmetrical positions are interchangeable with each other in the plan view.

5. The light source device according to claim 1, wherein at least one of the first afocal system, the second afocal system, the third afocal system, or the fourth afocal system comprises at least one lens having a positive refractive power and at least one lens having a negative refractive power.

6. The light source device according to claim 1, wherein in the plan view, a distance between a center of a use region of the first reflecting surface and a center of a use region of the second reflecting surface is larger than a maximum diameter of each of the use region of the first reflecting surface and the use region of the second reflecting surface, and is smaller than a maximum value of a maximum effective diameter of the first afocal system and a maximum effective diameter of the second afocal system, and a distance between a center of a use region of the third reflecting surface and a center of a use region of the fourth reflecting surface is larger than a maximum diameter of each of the use region of the third reflecting surface and the use region of the fourth reflecting surface, and is smaller than a maximum value of a maximum effective diameter of the third afocal system and a maximum effective diameter of the fourth afocal system.

7. The light source device according to claim 1, further comprising:

a fifth laser light source configured to emit a fifth laser light;

a sixth laser light source configured to emit a sixth laser light;

a fifth reflecting surface located between the first reflecting surface and the second reflecting surface in the plan view such that a reflection direction of the fifth laser light is directed toward the condenser lens along the optical axis;

a sixth reflecting surface located between the third reflecting surface and the fourth reflecting surface in the plan view such that a reflection direction of the sixth laser light is directed toward the condenser lens along the optical axis;

a fifth afocal system disposed on a fifth optical path from the fifth laser light source to the condenser lens such that the fifth laser light exits toward the fifth reflecting surface; and a sixth afocal system disposed on a sixth optical path from the sixth laser light source to the condenser lens such that the sixth laser light exits toward the sixth reflecting surface.

8. The light source device according to claim 7, further comprising:

a seventh laser light source configured to emit a seventh laser light;

a seventh reflecting surface located between the first reflecting surface and the third reflecting surface in the plan view at a position farthest from the condenser lens such that a reflection direction of the seventh laser light is directed toward the condenser lens along the optical axis; and a seventh afocal system disposed on a seventh optical path from the seventh laser light source to the condenser lens such that the seventh laser light exits toward the seventh reflecting surface.

9. The light source device according to claim 8, further comprising:

an eighth laser light source configured to emit an eighth laser light;

an optical element comprising:

the seventh reflecting surface, and an eighth reflecting surface on a side opposite to the seventh reflecting surface such that a reflection direction of the eighth laser light is directed toward the condenser lens along the optical axis; and an eighth afocal system disposed on an eighth optical path from the eighth laser light source to the condenser lens such that the eighth laser light exits toward the eighth reflecting surface.

10. The light source device according to claim 1, further comprising:

a first substrate supporting the first laser light source and the second laser light source; and a second substrate supporting the third laser light source and the fourth laser light source on a side opposite to the first substrate with respect to the optical axis.

11. The light source device according to claim 10, wherein the first substrate and the second substrate are flat plates, the first laser light source and the second laser light source are disposed on both sides of a first center line of the first substrate, the first center line being parallel to the optical axis, and the third laser light source and the fourth laser light source are disposed on both sides of a second center line of the second substrate, the second center line being parallel to the optical axis.

12. The light source device according to claim 10, wherein the first substrate and the second substrate are heat dissipation substrates.

13. The light source device according to claim 1, further comprising a homogenizing optical system disposed on an exiting side of the condenser lens.

14. The light source device according to claim 1, wherein each of the first laser light source, the second laser light source, the third laser light source, and the fourth laser light source comprises a plurality of semiconductor laser elements.

15. A heating system comprising:

a conveying device configured to convey a heating target in a first direction; and a heating module configured to emit a heating laser light toward the conveying device, wherein the heating module comprises a plurality of the light source devices comprising:

a first laser light source configured to emit a first laser light;

a second laser light source configured to emit a second laser light;

a third laser light source configured to emit a third laser light;

a fourth laser light source configured to emit a fourth laser light;

a condenser lens;

a first reflecting surface located at a first distance along an optical axis of the condenser lens from the condenser lens such that a reflection direction of the first laser light is directed toward the condenser lens along the optical axis;

a second reflecting surface located at a second distance along the optical axis from the condenser lens such that a reflection direction of the second laser light is directed toward the condenser lens along the optical axis;

a third reflecting surface located at a third distance along the optical axis from the condenser lens such that a reflection direction of the third laser light is directed toward the condenser lens along the optical axis;

a fourth reflecting surface located at a fourth distance along the optical axis from the condenser lens such that a reflection direction of the fourth laser light is directed toward the condenser lens along the optical axis;

a first afocal system disposed on a first optical path from the first laser light source to the first reflecting surface such that the first laser light exits toward the first reflecting surface;

a second afocal system disposed on a second optical path from the second laser light source to the second reflecting surface such that the second laser light exits toward the second reflecting surface;

a third afocal system disposed on a third optical path from the third laser light source to the third reflecting surface such that the third laser light exits toward the third reflecting surface;

a fourth afocal system disposed on a fourth optical path from the fourth laser light source to the fourth reflecting surface such that the fourth laser light exits toward the fourth reflecting surface;

a first substrate supporting the first laser light source and the second laser light source; and a second substrate supporting the third laser light source and the fourth laser light source on a side opposite to the first substrate with respect to the optical axis, wherein, when a plan view taken in a direction along the optical axis is divided into a first quadrant, a second quadrant, a third quadrant, and a fourth quadrant with a position of the optical axis serving as an origin, the first reflecting surface is located in the first quadrant, the second reflecting surface is located in the second quadrant, the third reflecting surface is located in the third quadrant, and the fourth reflecting surface is located in the fourth quadrant, the heating module is disposed in the first direction, and the plurality of light source devices are arranged in the first direction such that short-side directions of the first substrate and the second substrate coincide with a direction perpendicular to a direction of the optical axis in a plan view perpendicular to the first direction.

16. The heating system according to claim 15, wherein the first substrate and the second substrate are flat plates, the first laser light source and the second laser light source are disposed on both sides of a first center line of the first substrate, the first center line being parallel to the optical axis, and the third laser light source and the fourth laser light source are disposed on both sides of a second center line of the second substrate, the second center line being parallel to the optical axis.

17. The heating system according to claim 15, wherein the first substrate and the second substrate are heat dissipation substrates.

18. A light source device comprising:

a first laser light source configured to emit a first laser light;

a second laser light source configured to emit a second laser light;

a third laser light source configured to emit a third laser light;

a fourth laser light source configured to emit a fourth laser light;

a condenser lens;

a first reflecting surface located at a first distance along an optical axis of the condenser lens from the condenser lens such that a reflection direction of the first laser light is directed toward the condenser lens along the optical axis;

a second reflecting surface located at a second distance along the optical axis from the condenser lens such that a reflection direction of the second laser light is directed toward the condenser lens along the optical axis;

a third reflecting surface located at a third distance along the optical axis from the condenser lens such that a reflection direction of the third laser light is directed toward the condenser lens along the optical axis;

a fourth reflecting surface located at a fourth distance along the optical axis from the condenser lens such that a reflection direction of the fourth laser light is directed toward the condenser lens along the optical axis;

a first afocal system disposed on a first optical path from the first laser light source to the first reflecting surface such that the first laser light exits toward the first reflecting surface;

a second afocal system disposed on a second optical path from the second laser light source to the second reflecting surface such that the second laser light exits toward the second reflecting surface;

a third afocal system disposed on a third optical path from the third laser light source to the third reflecting surface such that the third laser light exits toward the third reflecting surface; and a fourth afocal system disposed on a fourth optical path from the fourth laser light source to the fourth reflecting surface such that the fourth laser light exits toward the fourth reflecting surface, wherein, when a plan view taken in a direction along the optical axis is divided into a first quadrant, a second quadrant, a third quadrant, and a fourth quadrant with a position of the optical axis serving as an origin, the first reflecting surface is located in the first quadrant, the second reflecting surface is located in the second quadrant, the third reflecting surface is located in the third quadrant, and the fourth reflecting surface is located in the fourth quadrant, and wherein the second quadrant is located distant from the first quadrant in a certain direction, the third quadrant is located distant from the second quadrant in another direction intersecting the certain direction, the fourth quadrant is located distant from the third quadrant in an opposite direction to the certain direction, and the first quadrant is located distant from the fourth quadrant in an opposite direction to the another direction.

* * * * *